Patented Mar. 11, 1924.

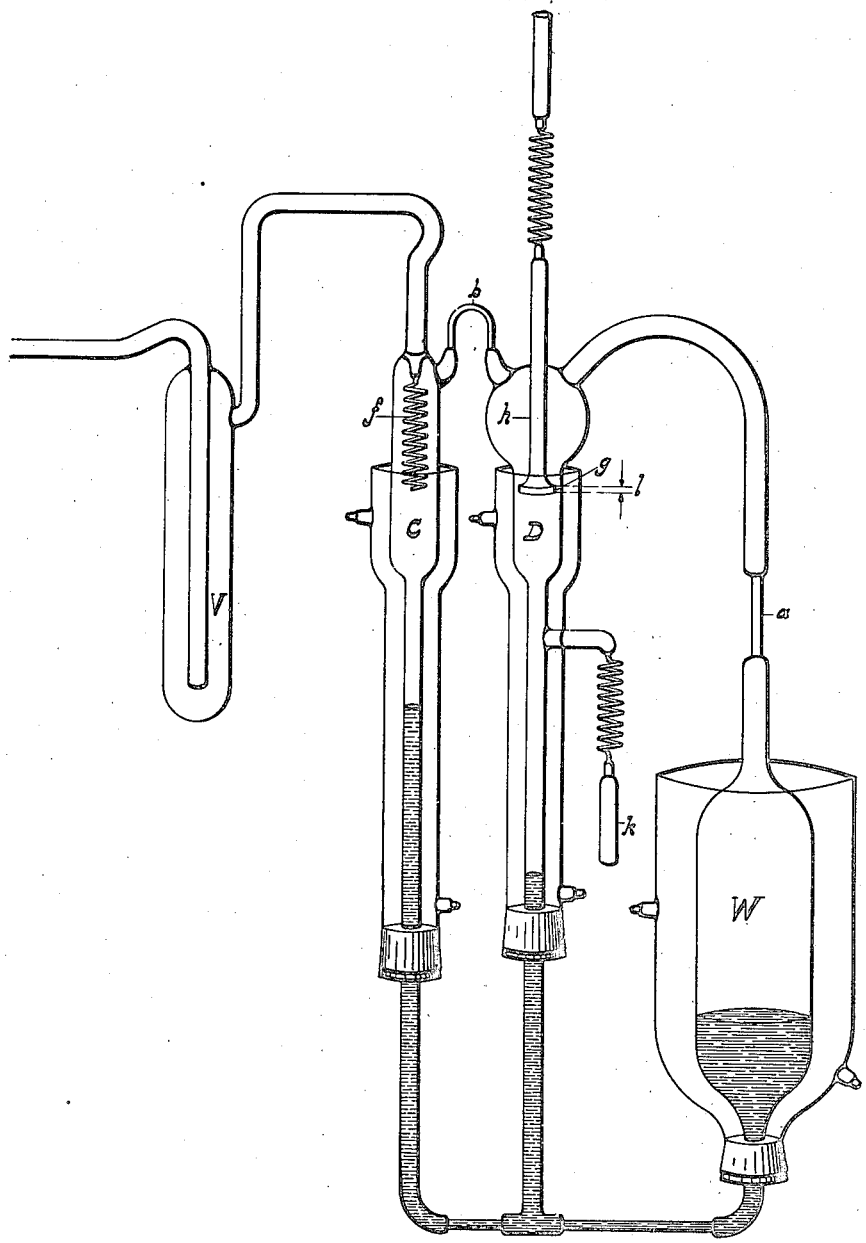

1,486,521

UNITED STATES PATENT OFFICE.

GUSTAV LUDWIG HERTZ, OF EINDHOVEN, NETHERLANDS, ASSIGNOR TO NAAMLOOZE VENNOOTSCHAP PHILIPS' GLOEILAMPENFABRIEKEN, OF EINDHOVEN, NETHER-LANDS.

METHOD OF SEPARATING GASES FROM MIXTURES THEREOF.

Application filed April 17, 1923. Serial No. 632,798.

*To all whom it may concern:*

Be it known that I, Dr. GUSTAV LUDWIG HERTZ, a subject of the Republic of Germany, residing at Eindhoven, in the Province of North-Brabant, in the Kingdom of the Netherlands, have invented certain new and useful Improved Methods of Separating Gases from a Mixture Thereof, of which the following is a specification.

This invention relates to an improved method of separating gases from a mixture thereof.

It is known that gases can be separated from a gas mixture by passing the gases through solid screens or through capillary. The method of separating gases according to this invention is based on an entirely new principle.

The method according to the invention is characterised in that a gas mixture is made to diffuse into a gaseous fluid flowing with a predetermined velocity. Preferably the velocity of the gaseous fluid will be regulable and the nature of this fluid will be chosen such that it can be separated from the gas to be isolated or from each of the gases to be isolated. Owing to the different diffusion-coefficients of the different components of the gas mixture the concentration of each of these components in the current of gaseous fluid will have quite a different course. There will be points where the concentration of a certain component, which for instance is most diffusible of all, is relatively high with regard to the concentration of the other less diffusible components.

When removing the gas fraction at such a point a mixture of the flowing gaseous fluid with said component may be obtained in an almost pure condition. By then separating the gaseous fluid from said fraction by a condensation process or a chemical process or in any other suitable manner, the component separated from the primary gas mixture is obtained in an almost pure condition.

At other points in the current of gaseous fluid, the concentration of a second gas component will have increased, which permits of leading away from this point a gas mixture, enriched in the latter component.

The exact course of the method depends on (1) the velocity of the current along that portion of the path where the diffusing process principally takes place (this path may be referred to as "diffusion path"), and (2) the length of this path and (3) the angle made by the latter with the direction of the current of the gaseous fluid.

The current velocity to be chosen of the gaseous fluid depends on the composition of the gas mixture and on the desired results. In order to obtain the maximum output it is advisable to design the apparatus so that it permits of working with the maximum current velocity of the gaseous fluid. In the case of diffusion taking place against the flow of gas, this implies as short a diffusion path as possible.

In carrying out the invention a vessel may be used, connected to inlet- and outlet-tubes for the stream of gaseous fluid, for the gas mixture to be separated and for the gases which have diffused apart from each other, while moreover an arrangement can be provided for separating the gaseous fluid from the components of the gas mixture. In addition the apparatus may be provided with means for adjusting the current velocity or the length of the diffusion path or both, which like the arrangement for separating the flowing gaseous fluid from the gas components and other auxiliary arrangements, will be obvious to those skilled in the art.

By arranging the inlet- and outlet-tubes in relation to each other in such a way that the gas component to be separated must diffuse against the current, it is possible to choose the conditions so that only this component is able to do so, the others on the contrary, being led astray by the current to a condenser with which the apparatus, if desired, is provided, while the component which diffused out is led away from a point of great concentration and then liberated from the gaseous fluid.

The drawing diagrammatically represents an apparatus for use in carrying out the invention and in which the gases to be separated are made to diffuse into water vapour.

Referring to the drawing the apparatus consists essentially of three parts: a water vessel W, a diffusion vessel D and a condensation vessel C, which vessels may be in communication as indicated in the drawing. The three vessels, W, D and C are surrounded by waterjackets by means of which their temperature may be exactly adjusted. The temperature in W should be higher than in D and C. The vapour which is developed in W flows through a capillary $a$ into the upper spherical part of D at a current velocity which is dependent on the temperature in W. The temperatures in D and C are regulated so that a portion of the vapour is condensed in D and a portion in C. In D an inverted funnel-shaped tube $h$ is so opened out that between the wall of the funnel and the wall of D a narrow space $g$ of length $l$ remains, through which space the vapour will flow. The path $l$ is that which has been termed the diffusion path. By making the tube $h$ slidable in a vertical direction the length of the diffusion path may be varied within certain limits, for example, if the tube $h$ is slid upwards the way $l$ is shortened, as the enlarged lower part of the tube $h$ remains partly in the upper spherical part of D.

Now a gas mixture of which the total pressure is not greater than the vapour pressure of the water in W, on entering through said tube $h$ in the vessel D will partly diffuse against the stream of water vapour, and so arrive in the upper part of D and with the water vapour which is flowing through a tube $b$, also in C. The composition of this part depends on the diffusion constants of the components of the mixture. Leading therefore through $h$ a mixture of two gases with different diffusion constants, for instance a mixture of helium and neon, and choosing properly the velocity of the water vapour, only the gas with the greater diffusion-constant (helium) will be able to diffuse against the water vapour, whereas the neon stays almost wholly behind. By these means an almost complete separation of the gases can be effected. The helium which has arrived in C, flows with a portion of the water vapour through a very narrow capillary $f$ into an exhausted space V, where the water vapour may be frozen, for instance by means of liquid air, and after that into a vessel, where the separated gas is collected in an almost pure condition. The capillary serves to afford the required resistance to the current which, in consequence of the great difference of pressure in C and V, would otherwise obtain too great a velocity and thus unfavourably influence the diffusion process. The other component (neon) may be led away by means of a separate outlet-tube $k$ and separated from the water vapour in the same manner as the first component. The inlet-tube $h$ and the outlet-tube $k$ are likewise provided with capillaries. If the component separated near $k$ appears to be insufficiently pure, it may be caused to flow once more through $h$ by the aid of a circulation-device and subjected to the diffusion-process until said component has obtained the desired purity.

The whole apparatus with exception of the vessel V is placed in an enclosure, in which the temperature is kept somewhat higher than in the watervessel.

The form and the relative position of the different parts of the apparatus may be varied in numerous ways, and also the method of regulating the current velocity or the length of the diffusion-path. It is not necessary that the current of gaseous fluid and the instreaming gas mixture should meet each other in the manner described above. Thus it is not necessary that one of the components should diffuse against the stream of gaseous fluid forming an angle of 180° therewith but also with much smaller angles very favourable results may be obtained. Neither is it essential that the diffusion path should have the form of a narrow slit. It should even be possible to allow the diffusion to take place in the wall of a porous body. Instead of water vapour any suitable gaseous fluid can be used provided that it can be separated from the gases to be collected.

In many cases it will be desirable or necessary to place several apparatus in a cascade-like series in order to collect the desired gas at the end of the series in a sufficiently pure condition.

It is remarked that the apparatus for separating gases according to the above described method is described in my co-pending application Serial Number 632,797.

What I claim is:

1. A method of separating the components of a gas-mixture by diffusion consisting in allowing a gas-mixture to diffuse into a gaseous fluid flowing with a predetermined velocity and in removing at least one of the components of the mixture diffused in said streaming gaseous fluid together with part of the latter from places where the concentration of said components to be collected is relatively high with regard to the concentration of the other components.

2. A method of separating the components of a gas-mixture by diffusion consisting in allowing a gas-mixture to diffuse into a gaseous fluid flowing with a predetermined velocity and which fluid can be separated from at least one of said components and in removing at least one of the components of the mixture diffused in said streaming gaseous fluid together with part of the latter from places where the concentration of said components to be collected is relatively high with regard to the concentration of the other components.

3. A method of separating the components of a gas-mixture by diffusion consisting in allowing a gas-mixture to diffuse into a gaseous fluid flowing with a predetermined velocity and which fluid can be separated from at least one of said components and in removing at least one of the components of the mixture diffused in said streaming gaseous fluid together with part of the latter from places where the concentration of said components to be collected is relatively high with regard to the concentration of the other components and separating the gaseous fluid from the collected components beyond the place where diffusion has taken place.

4. A method of separating the components of the gas-mixture by diffusion consisting in allowing a gas-mixture to diffuse into a gaseous fluid flowing with a regulable velocity and in removing at least one of the components of the mixture diffused in said streaming gaseous fluid together with part of the latter from places where the concentration of said components to be collected is relatively high with regard to the concentration of the other components.

5. A method of separating the components of the gas-mixture by diffusion consisting in allowing a gas-mixture to diffuse into a gaseous fluid flowing with a regulable velocity and which fluid can be separated from at least one of said components and in removing at least one of the components of the mixture diffused in said streaming gaseous fluid together with part of the latter from places where the concentration of said components to be collected is relatively high with regard to the concentration of the other components.

6. A method of separating the components of a gas-mixture by diffusion consisting in allowing a gas-mixture to diffuse into a gaseous fluid flowing with a regulable velocity and which fluid can be separated from at least one of said components and in removing at least one of the components of the mixture diffused in said streaming gaseous fluid together with part of the latter from places where the concentration of said components to be collected is relatively high with regard to the concentration of the other components and separating the gaseous fluid from the collected components beyond the place where diffusion has taken place.

7. A method of separating the components of a gas-mixture by diffusion consisting in allowing a gas-mixture to diffuse into a streaming gaseous fluid, in choosing the velocity of said fluid as high as possible and in removing at least one of the components of the mixture diffused in said streaming gaseous fluid together with part of the latter from places where the concentration of said components to be collected is relatively high with regard to the concentration of the other components.

8. A method of separating the components of a gas-mixture by diffusion consisting in allowing a gas-mixture to diffuse into a gaseous fluid flowing with a predetermined velocity and which fluid can be separated from at least one of said components, in choosing the velocity of said fluid as high as possible and in removing at least one of the components of the mixture diffused in said streaming gaseous fluid together with part of the latter from places where the concentration of said components to be collected is relatively high with regard to the concentration of the other components.

9. A method of separating the components of a gas-mixture by diffusion consisting in allowing a gas-mixture to diffuse into a streaming gaseous fluid which fluid can be separated from at least one of said components in choosing the velocity of said fluid as high as possible and in removing at least one of the components of the mixture diffused in said streaming gaseous fluid together with part of the latter from places where the concentration of said components to be collected is relatively high with regard to the concentration of the other components and separating the gaseous fluid from the collected components beyond the place where the diffusion has taken place.

10. A method of separating the components of a gas-mixture by diffusion consisting in allowing a gas-mixture to diffuse against a gaseous fluid, flowing with a predetermined velocity and in removing at least one of the components of the mixture diffused in said streaming gaseous fluid together with part of the latter from places where the concentration of said components to be collected is relatively high with regard to the concentration of the other components.

In testimony whereof I affix my signature.

Dr. GUSTAV LUDWIG HERTZ.